United States Patent
Kwon et al.

(10) Patent No.: US 7,168,050 B1
(45) Date of Patent: Jan. 23, 2007

(54) OSD DEVICE AND METHOD FOR DISPLAYING MENU THEREIN FOR DIGITAL TV

(75) Inventors: Il Gun Kwon, Seoul (KR); Ji Yeon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 09/716,227

(22) Filed: Nov. 21, 2000

(30) Foreign Application Priority Data

Dec. 7, 1999 (KR) .............................. 1999-55491

(51) Int. Cl.
*G06F 3/00* (2006.01)

(52) U.S. Cl. .................. 715/843; 715/841; 715/810

(58) Field of Classification Search ............... 345/730, 345/732, 764, 810, 817, 819, 828, 829, 831, 345/833, 841, 856, 859, 860, 157, 902; 715/843, 715/841
See application file for complete search history.

(56) References Cited

U.S. PATENT DOCUMENTS

| | | | | |
|---|---|---|---|---|
| 4,821,211 A | * | 4/1989 | Torres ........................ 345/853 |
| 5,293,479 A | * | 3/1994 | Quintero et al. ............. 715/841 |
| 5,588,107 A | * | 12/1996 | Bowden et al. ............. 715/828 |
| 5,602,597 A | * | 2/1997 | Bertram ....................... 725/56 |
| 5,751,373 A | * | 5/1998 | Ohyama et al. .............. 725/59 |
| 5,781,247 A | * | 7/1998 | Wehmeyer et al. ......... 348/569 |
| 6,133,911 A | * | 10/2000 | Kim .......................... 345/719 |
| 6,252,597 B1 | * | 6/2001 | Lokuge ...................... 345/841 |
| 6,539,548 B1 | * | 3/2003 | Hendricks et al. .......... 725/109 |

FOREIGN PATENT DOCUMENTS

JP 09-266374 7/1997

* cited by examiner

*Primary Examiner*—Kieu D. Vu
(74) *Attorney, Agent, or Firm*—Birch, Stewart, Kolasch & Birch, LLP (57) ABSTRACT

An On Screen Display device and method for displaying a menu is disclosed. In the present invention, a plurality of OSD main menu items are displayed on a screen and a space between adjacent menu items is opened to display sub-menu items. Thus, a user can conveniently select a menu as the menu items and the sub-menu items are simultaneously displayed. Accordingly, a limited area of the screen can effectively be used to display more menus.

15 Claims, 7 Drawing Sheets

OSD DEVICE AND METHOD FOR DISPLAYING MENU THEREIN FOR DIGITAL TV

BACKGROUND OF THE INVENTION

1. Field of the Invention

The present invention relates to a display device and more particularly, to a method for displaying a menu on an On Screen Display device.

2. Background of the Related Art

On Screen Device (OSD) displays information to aid in the operation of the display on a screen. Accordingly, an OSD device may be implemented in a TV receiver and other devices with a screen such as a video cassette recorder and a computer.

In a method for displaying an OSD on a TV receiver, menus are successively displayed on a TV screen according to user selections input through a selecting device such as an operation panel or a remote control. Generally, a main menu is displayed including option items or control functions available on a TV receiver. If a user selects an item from the main menu, sub-menu items are displayed according to the selected item.

Typically, as a sub-menu is displayed, the main menu which had previously been displayed disappears and only the sub-menu items of the selected main menu item are displayed on the screen. Thereafter, when the user selects a menu item from the sub-menu, a sub-menu or a function control window corresponding to the selected sub-menu item can be displayed on the screen. Thus, a user can select and control a function of the TV receiver using the selecting device.

However, in the method of displaying an OSD as described above, the relation between the main menu items and sub-menu items cannot easily be understood at a glance because the main menu disappears when a sub-menu is displayed. Therefore, if a particular function is not displayed by a sub-menu item, a user must search for the function by returning and selecting different menu items, which would be inconvenient to a user as well as a waste of time.

Accordingly, another method in the related art suggests displaying a plurality of main menu items in a first region of the TV screen and displaying sub-menu items of a selected main menu item in a second region of the TV screen. Here, the second region is outside of and different from the first region. As a result, the main menu items and the sub-menu items can simultaneously be displayed in the first and second regions of the screen. Thus, a user can see relations between the main menu items and the sub-menu items, eliminating some of the disadvantages of the unnecessary coming back and forth between the main menu and sub-menus.

However, the above method is a stepwise display method, and would require a third and possibly a fourth separate display regions on the screen if the menu items have more than two levels of sub-menus. Moreover, since a display screen has a limited area as well as limits on legible sizes of characters or graphics for an OSD, displaying more than two separate regions on the screen may be difficult.

SUMMARY OF THE INVENTION

Accordingly, an object of the present invention is to solve at least the problems and disadvantages of the related art.

An object of the present invention is to provide a more user friendly OSD display.

Another object of the present invention is to provide an OSD display which permits an efficient display of many OSD menu items on a limited area of a screen.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for displaying a menu using an OSD device includes displaying a plurality of OSD main menu items on a screen, opening a space between adjacent main menu items through a selecting device, and displaying at least one sub-menu item belonging to the main menu item in the opened space.

In another embodiment of the present invention, a method for displaying a menu using an OSD device includes (1) displaying a plurality of OSD first menu items in a first region of a screen and displaying an item indicator using a menu selecting device, (2) opening a space between a selected first menu item and a first menu item adjacent the selected first menu item when a first menu item is selected using the item indicator, (3) displaying at least one sub-menu item of the selected first menu item in the opened space, (4) erasing the displayed at least one sub-menu item from the screen and closing the space when the item indicator is set to select a new second item from the main menu (5) opening a space between the second menu item and a menu item adjacent the second menu item, and (6) displaying at least one sub-menu item of the second menu item in the new space.

In still another embodiment of the present invention, a method for displaying a menu using an OSD device includes (1) displaying a plurality of OSD first menu items in a first region of a screen using a menu selecting device and displaying an item indicator, (2) opening a space between a selected first menu item and a first menu item adjacent the selected first menu item when a first menu item is selected using the item indicator, (3) displaying at least one OSD second menu item corresponding to a sub-menu of the selected first menu item in the opened space, (4) displaying a function control window for a selected second menu item in a second region of the screen when the item indicator is set to select a second menu item, and (5) selecting and executing a desired function in the function control window using the menu selecting device and the item indicator.

In a further embodiment of the present invention, an OSD device includes a storage for storing a plurality of OSD first menu items, a data on at least one second menu item corresponding to a sub-menu item of each of the first menu items, and a system program; a screen device for displaying the OSD menus; a selecting device for generating an item indicator on the screen, moving a cursor between menus displayed on the screen, and selecting a desired menu; and a controller for displaying the first menu items on the screen device, opening a space between the selected first menu item and a menu item adjacent to the selected first menu item, and displaying at least one second menu item corresponding to the sub-menu of the selected first menu item in the opened space of the screen device.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the present invention, examples of which are illustrated in the accompanying drawings. Generally, an OSD device and method for displaying a menu according to the present invention can be implemented in different displays such as TV receivers, VCRs, and camcorders. However, for purpose of explanation, the present invention will be explained with reference to a TV receiver. Accordingly, FIG. 1 is a block diagram of an OSD device implemented in a TV receiver to display a menu in accordance with the present invention applied thereto.

Figure 1:
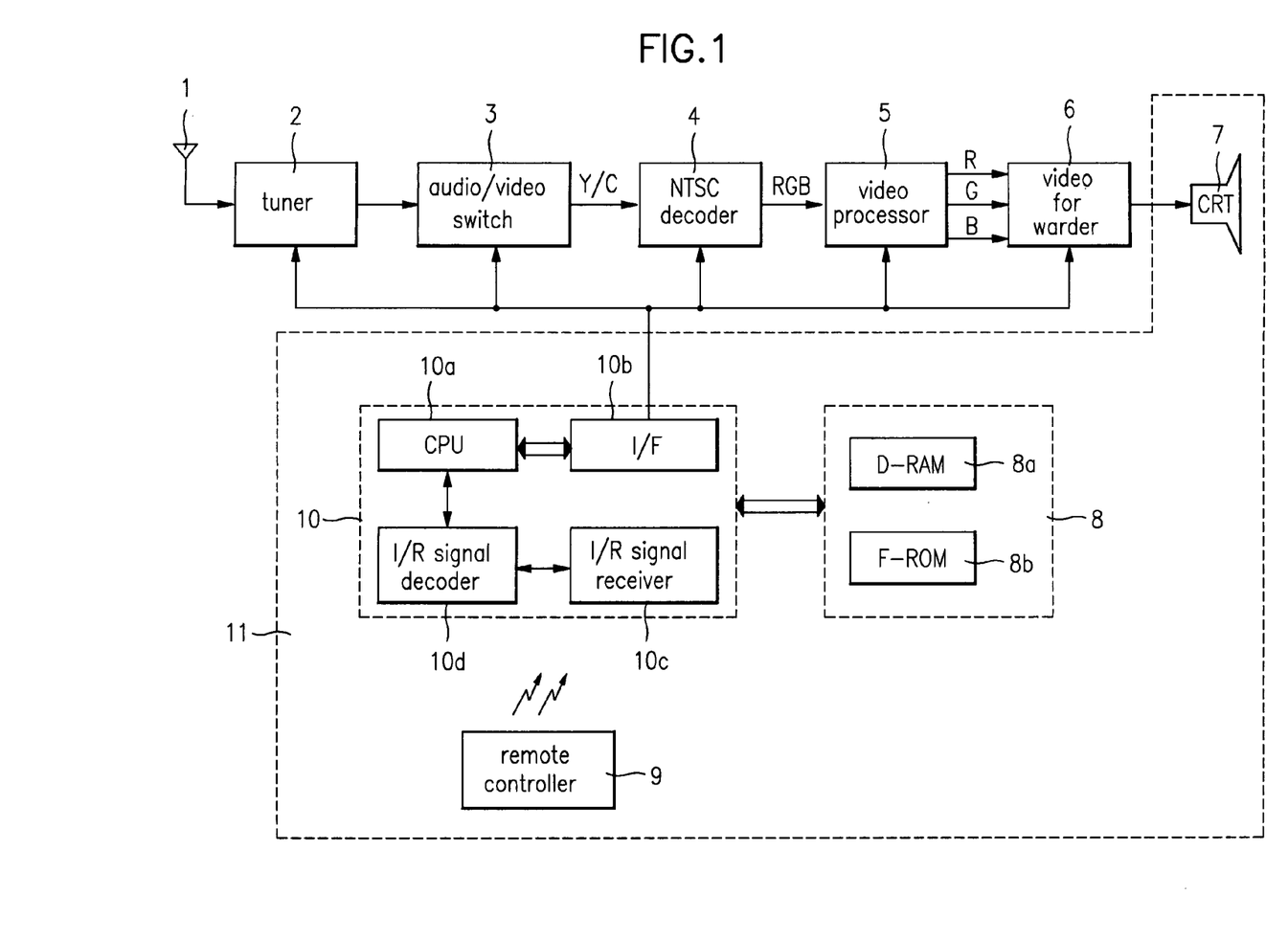
FIG. 1 is a block diagram of a TV receiver having an OSD device in accordance with the present invention.

Referring to FIG. 1, a TV receiver includes an antenna 1, a tuner 2, an audio/video switch 3, a NTSC decoder 4, a video processor 5, a video forwarder 6, a Cathode Ray Tube (CRT) 7, a memory 8, a remote controller 9, and a controller 10. In the present embodiment, the memory 8 is implemented by a Dynamic Random Access Memory (DRAM) 8*a* and a Flash Read On Memory (FROM) 8*b*. Also, the controller 10 includes a central processing unit (CPU) 10*a*, an Intermediate Frequency (I/F) processor 10*b*, an InfraRed (I/R) signal receiver 10*c*, and an I/R signal decoder 10*d*.

Here, an OSD device 11 may be implemented by a combination of the CRT 7 as the screen, the memory 8, the remote controller 9 as the selecting device, and the controller 10. The operation of the TV receiver shown in FIG. 1 will next be explained.

When the I/R signal receiver 10*c* receives an I/R code signal from the remote controller 9, the I/R signal decoder 10*d* analyses the I/R code signal and forwards results of the analysis to the CPU 10*a*. The CPU 10*a* then executes a program stored in the FROM 8*b* according to the forwarded results.

For example, if the I/R code signal is a command to select a new channel, the results would indicate a change of channel and the CPU 10*a* would tune the necessary frequency signals from the antenna through the tuner 2 to receive the broadcasting signal corresponding to the selected channel. Also, the CPU 10*a* controls the audio/video switch 3 to receive only the TV signal among the different input sources. The signal which passes through the audio/video switch 3 is luminance/color (Y/C) signals. The Y/C signals received are converted into R/G/B signals through the NTSC decoder 4, modified into a display format through the video processor 5, and transferred to the CRT 7 through the video forwarder 6.

If the I/R code signal is for a command to display a menu, the results would indicate a display of menu items on the screen. The CPU 10*a* would then allocate a region of the DRAM 8*a* according to a system program corresponding to the display of menu items and generates a virtual image of the menu items within the allocated region in a bit map form. Here, the bit map is the OSD menu items. Thereafter, the bit map generated by the DRAM 8*a* is transferred to the video processor 5 through a data bus, and the video processor 5 combines a video signal from the NTSC decoder 4 and an OSD data from the DRAM 8*a* to form a combined video. Finally, the combined video to the CRT 7 through the video forwarder 6.

Particularly, the memory 8 is the storage which stores a plurality of first OSD menu items, data on at least one second menu item corresponding to sub-menu items of each of the first menu item, and the system program. The CRT 7 is the screen which displays the OSD menus. The remote controller 9 is the selecting device through which a cursor generated on the screen can be moved between the displayed menus to select a menu. Accordingly, the controller 10 displays the first menu items on the screen using the system program in response to a signal from the selecting device, and allocates a display region by opening a space between a selected first menu item and a first menu item adjacent to the selected first menu item. At least one second menu item corresponding to a sub-menu of the selected first menu item would then be displayed in the display region.

Figure 2:
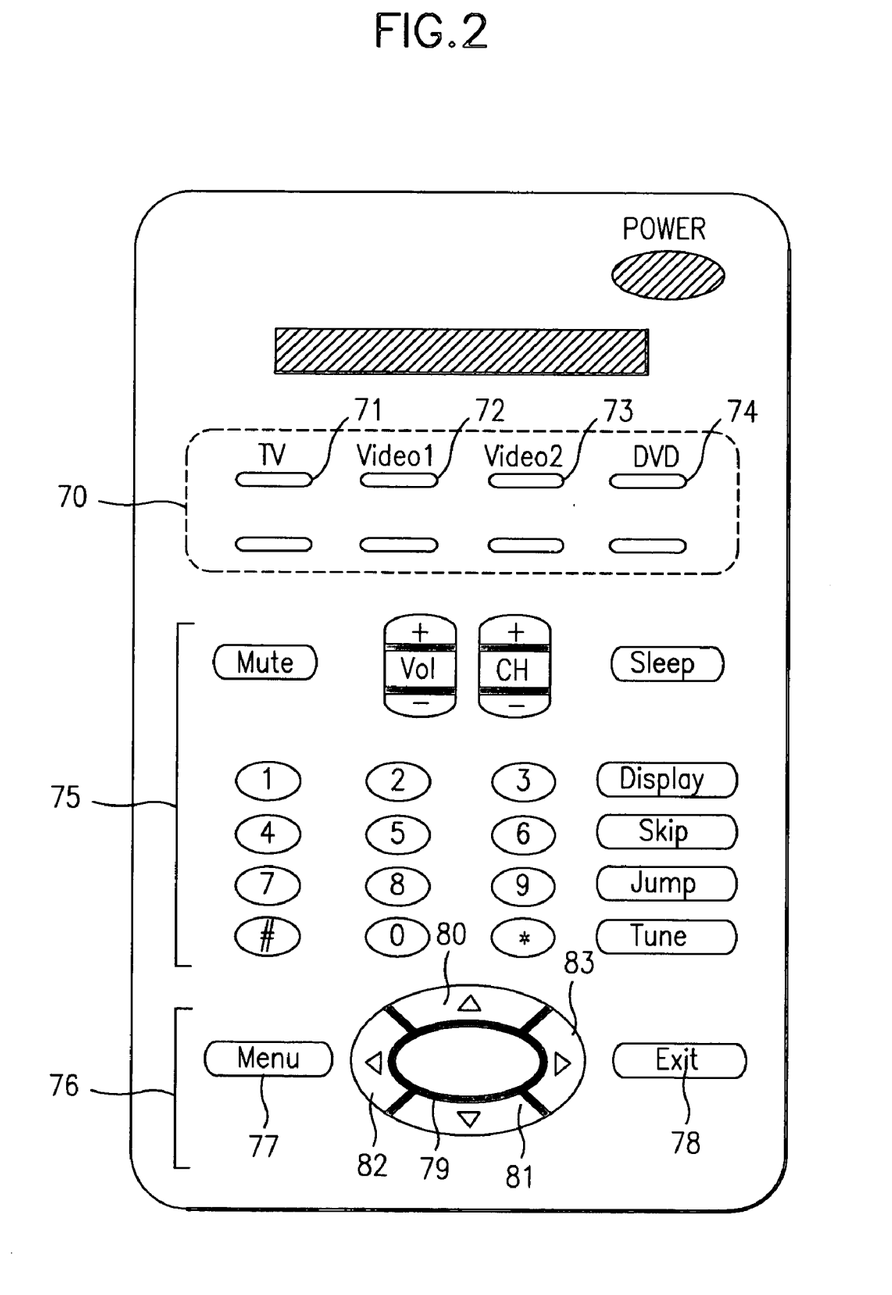
FIG. 2 is a view of a remote controller according to the present invention.

FIG. 2 shows an embodiment of a remote controller according to the present invention including a power switch, a first region 70, a second region 75, and a third region 76. The first region 70 includes a plurality of input keys such as buttons to designate the type of source to be processed by the TV receiver. Namely, a TV 71 is for selecting a TV signal input through a RF jack, a Video1 72 and Video2 73 are for selecting a composite video input through an RCA jack and audio L/R, respectively, a DVD 74 is for selecting a video and audio signals provided through an external terminal on the TV receiver for Y/Cr/Cb components.

The second region 75 includes input keys for the basic operations of a TV receiver such as changing a channel, controlling the volume, muting, and sleep programming.

The third region 76 includes input keys related to the display and selection of menu items. Accordingly, the third region 76 would closely relate to the present invention. Particularly, in a state when a video image is being displayed on the screen, the selection of a menu 77 would display menu items, i.e. the first menu items, on the screen. On the other hand, when menu items are already being displayed, the selection of the menu 77 would return the screen back to a previous screen. For example, if the menu 77 is entered while OSD sub-menu items are being displayed, the screen would return to display an upper menu level such as the main menu items. Also, if the menu 77 is entered while main menu items are being displayed or Exit 78 is entered, menu items are removed and the screen returns to video images such as a TV programming.

An Enter 79 is an input key for selecting a menu item or function displayed on the screen. For example, assuming that first level menu items, i.e. main menu items, are being displayed, if a user moves a cursor to one of the first level menu item and enters the Enter 79, the sub-menu items corresponding to the selected first menu item would be displayed on the screen. Namely, at least one second level menu item, i.e. a sub-menu item, of the selected first menu item would be displayed.

Furthermore, if the user moves the cursor to one of the second menu items and enters the Enter 79, a third level menu corresponding to the selected second menu items would be displayed. Here, the third menu items may be a lower level of sub-menu items or a function control window.

If a function control window is displayed, the user can select and control operations of the TV receiver such as brightness, hue, and contrast.

In the above operations, direction input keys 80~83 moves the cursor up, down, left, or right among the displayed menu items. Also, the user may use the direction input keys 80~83 to point to select one of the displayed menu items or control values of TV functions.

Accordingly, a selecting device includes direction input keys to allow a user to manipulate and control items displayed on the screen; and an Enter key which allows a user to select one of the displayed menu items. In addition, although the explained embodiment of the selecting device is a remote controller, other selecting device may be used such as a panel integrated to the OSD device, a keyboard connected to the OSD with a line, or a mouse connected to the OSD with a line.

Different embodiments of the present OSD device and method will next be explained. Generally, a plurality of OSD first menu items are successively displayed on a screen. The selecting device may then be manipulated to open a space between a selected first menu item and a first menu item adjacent to the selected first menu item. At least one second menu item corresponding to selected first menu item would be displayed in the opened space.

Here, the opened space begins continuously from the selected first item to a first item adjacent to the selected item. Also, the space may open simultaneously to display the second menu items as a first menu item is selected through the detecting device. Alternatively, the space may slide open within a predetermined time period to display second menu items when a first menu item is selected. Thereafter, when the cursor is moved to point at or select a new first menu item, the opened space displaying the second menu items closes, and a new space between the newly selected first menu item and a first menu item adjacent the new first menu item is opened to display sub-menu items corresponding to the new menu item.

The menu items may be displayed from top to bottom, or from left to right of the screen. Also, like second menu items, the first menu items may simultaneously be displayed or slide open within a predetermined time period to display the first menu items, when requested through a selecting device. Furthermore, the menu items of different levels may be displayed in different colors and/or different luminances, or may be displayed in same colors and same luminances.

For example, assume that a screen has a first color and a first luminance, that the first menu items have a second color and a second luminance, and that the second menu items have a third color and a third luminance. The first to third colors may be the same and the first to third luminances may be the same. Alternatively, the first to third colors may be different and the first to third luminances may be different. Namely, the second luminance may be brighter than the first luminance, but darker than the third luminance. Still alternatively, the second color may be the same with the third color, but different from the first color while the first to third luminances may be different. Here, the second luminance may also be brighter than the first luminance and darker than the third luminance. While only a few examples are illustrated, other combinations of colors and luminances may be implemented and made possible by the manufacturer.

In addition, the space in which menu items are displayed on the screen may be transparent or translucent such that a user can continue to view a regular TV program through the displayed menu while selecting a function. As in the color and luminance, the menus of different levels may be displayed in the same or different levels of transparency. For example, the main menu can be opaquely displayed while sub-menus or function windows are transparently displayed.

The first embodiment of the OSD device and method will now be explained with reference to FIG. 3~5.

In the first embodiment, a plurality of OSD first menu items are displayed in a first region of a screen together with an item indicator such as a cursor. If a user, through a selecting device, moves a cursor to point at and selects a OSD first menu item, a space between the selected first menu item and a first menu item adjacent to the selected first menu item is opened. At least one OSD second menu item corresponding to the selected first menu item is then displayed in the opened space. Here, the selected first menu item has a brighter luminance compared to other first menu items when the second menu items corresponding to the selected first menu item is being displayed.

Thereafter, if the user moves the cursor to point at and selects one of the displayed second menu items, at least one OSD third menu item or a function control window, corresponding to the selected second menu item is displayed, depending on the type of the selected second menu item. Here, the third menu items are displayed in an open space between the selected second menu item and a second menu item adjacent to the selected second menu item. However, a function control window is displayed in a second region of the screen. Thus, a user can operate the selecting device to further select a menu item or select a function to control, depending on the selected second menu item.

Figure 3:
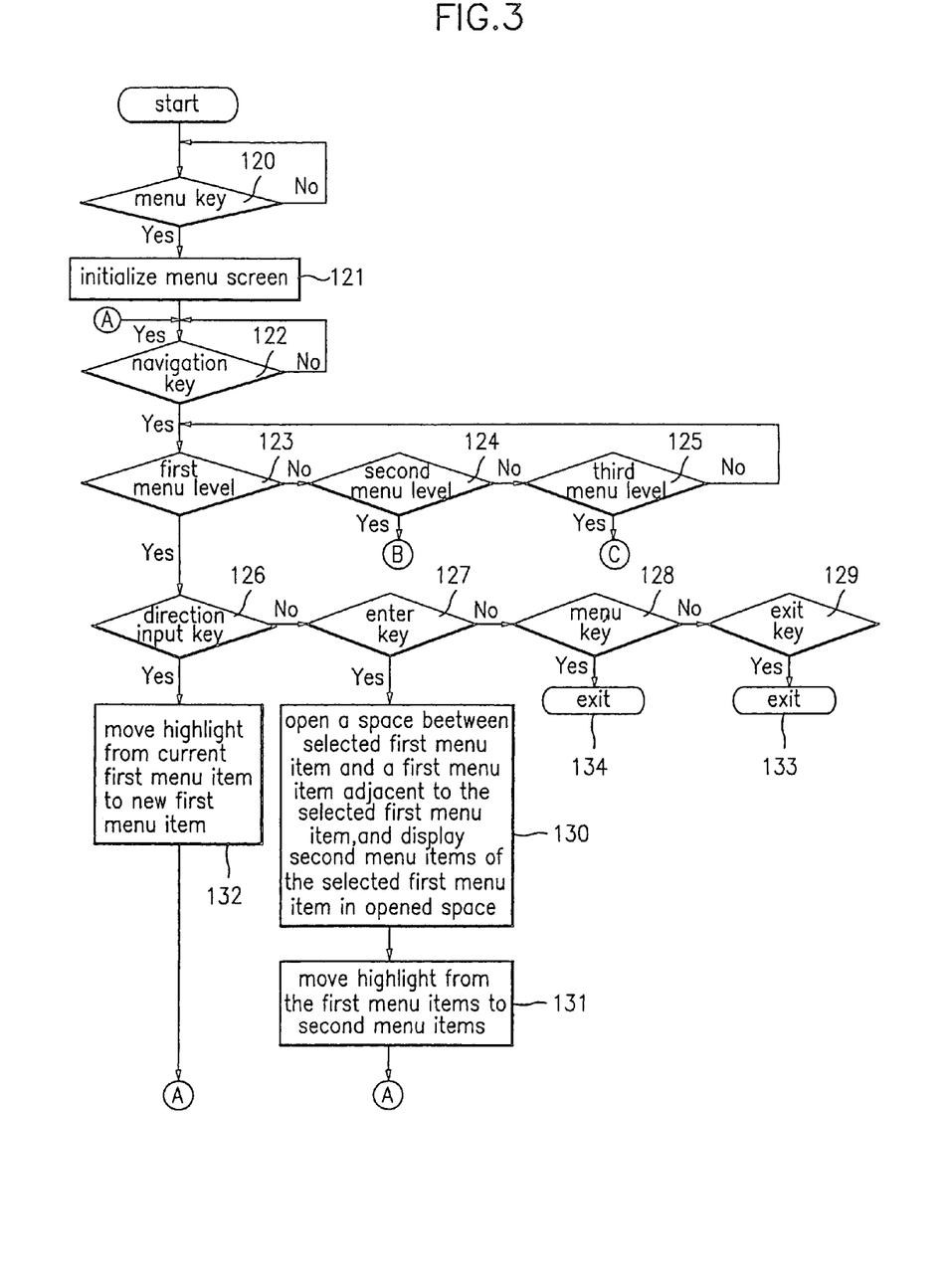
FIGS. 3 to 5 are flow charts showing a process for displaying menus in accordance with the present invention.
Figure 4:
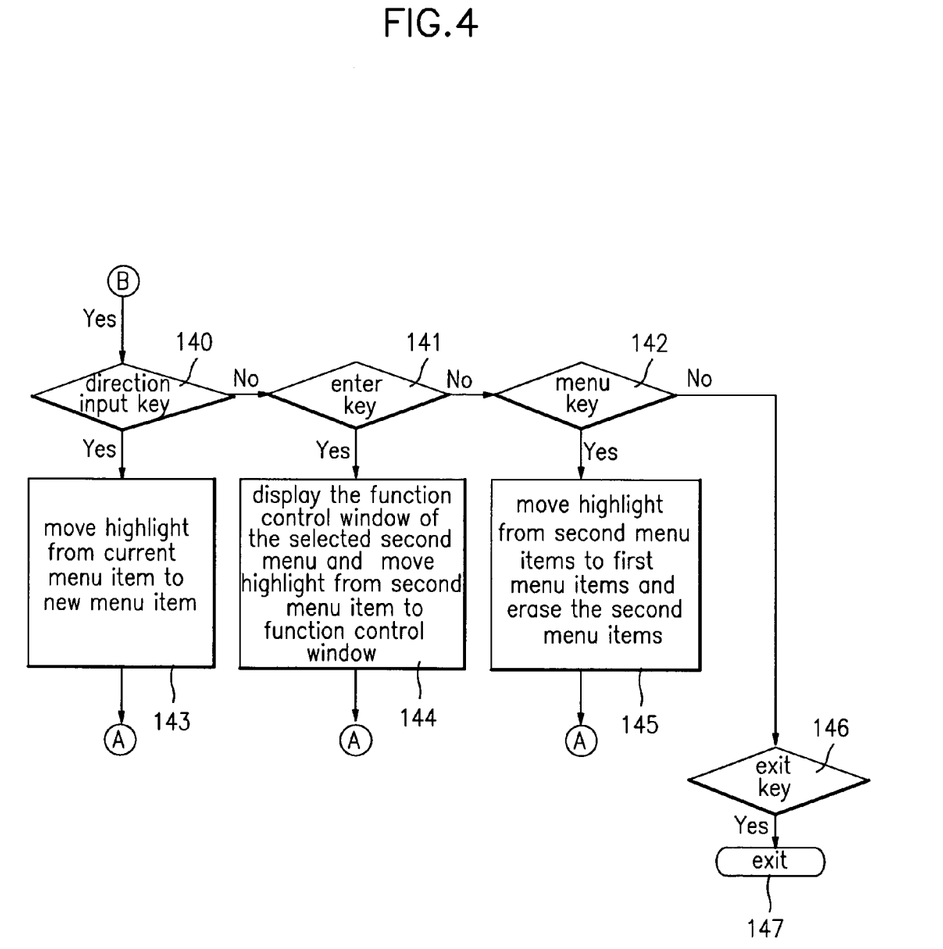
Figure 5:
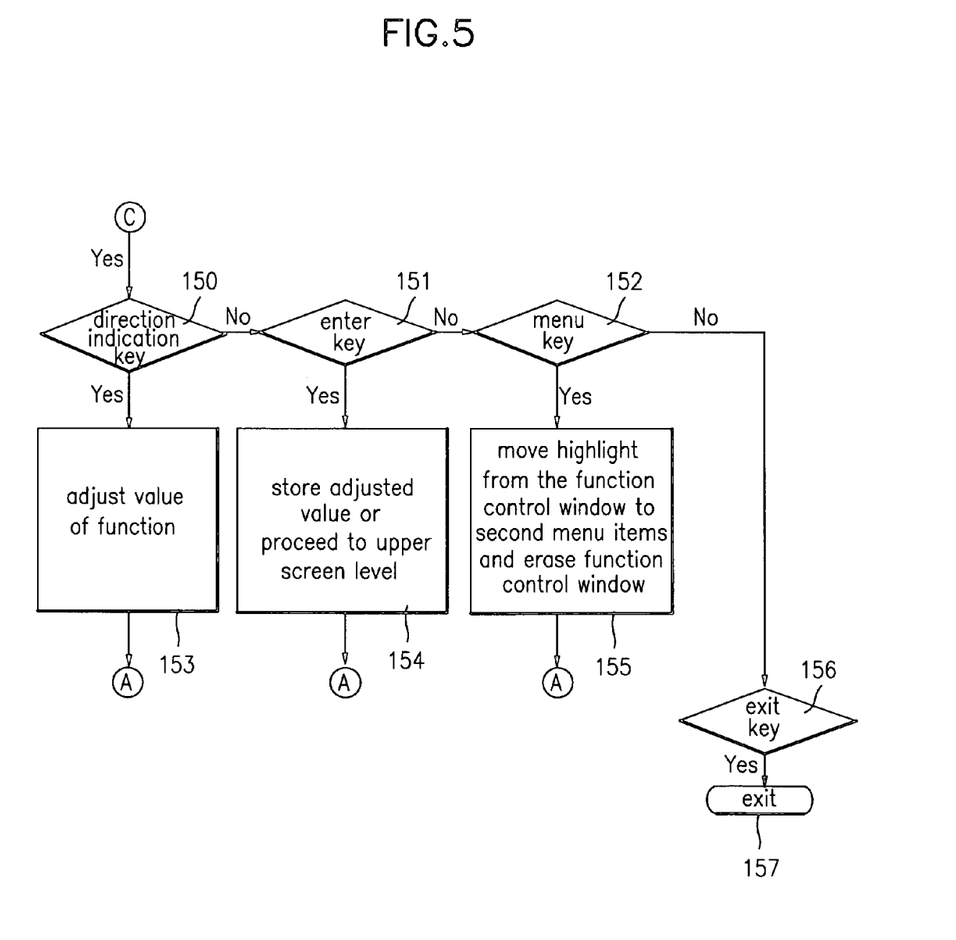

FIG. 3 is a flow chart showing a process for displaying menus in a first menu level in accordance with the first embodiment of the present invention and FIG. 4 is a flow chart showing a process for displaying menus in a second menu level in accordance with the first embodiment of the present invention, and FIG. 5 is a flow chart showing a process for displaying menus in a third menu level in accordance with the first embodiment of the present invention.

Referring to FIGS. 2 and 3, when the menu 77 input key is entered or has been entered through a selecting device (120), a determination is made whether the menu 77 is newly entered or has been already entered. If the menu 77 has been already entered, menu items would already be displayed in a first region of the screen. Accordingly, either upper level menu items are displayed or the screen is returned to regular TV display if the main menu items are already displayed. If the menu 77 is newly entered, for example while a regular TV is being displayed, a process for displaying menu items starts and an initial menu screen with first menu items, i.e. main menu items, is displayed in a first region of the screen, in a preset order (121). When menu items are initially displayed, the first of the first menu items is highlighted automatically, by default.

Once the menu items are displayed and if a command signal is received through the selecting device, a determination is made whether the command signal relates to a selection of a menu item (122). If the signal is not from a navigation key, the signals are disregarded until a signal from a navigation key is received. If the signal is from navigation keys such as direction input keys 80~83, the Enter 79, or the Exit 78, which relate to a menu selection, the status of the display on the screen is checked. Particularly, a determination is made whether the screen is in the first menu level displaying first menu items (123); a second menu level displaying second menu items, i.e. sub-menu items of the first menu item (124); or a third menu level displaying third menu items, i.e. sub-menu items of the second menu item or a function control window (125). For purposes of explanation, assume from hereon that the navigation keys are one of the direction input keys 80~83, the Enter 79 key, Menu 77 key, or the Exit 79 key.

Also assuming that the screen is in the first menu level, if a signal from one of the direction input keys 80~83 is received (126), the highlight is moved from a currently highlighted first menu item to a different first menu item according to a direction indicated by the received signal (132). If a signal from a direction input key is not received, but Enter 79 signal is received (127), the currently highlighted first menu item is selected and a space between the selected first menu item and a first menu item adjacent to the selected first menu item is opened (130). Thus, at least one second menu item corresponding to the selected first menu item is displayed in the opened space, by a preset order.

As explained above, the space may open and display the second menu items simultaneously with the selection of a first menu item, or the space may slide open upon a selection of a first menu item to display the second menu items within a preset time period. Once the second menu items are displayed, the highlight may or may not move from the selected first menu item to a second menu item (131).

However, if the Menu 77 is entered (128), the screen returns to a state before the first menu level state (134). Namely, the displayed first menu items disappear from the screen to display a regular TV program. Also, if the Exit 78 is entered (129), the menu selection ends and the screen returns to a state before the first menu level state, i.e. to the regular TV program (133).

Assuming now that the screen is determined to be in the second menu level in step 124 of FIG. 3, the process will be explained with reference to FIG. 4. As with the initial display of the first menu items, the first of the second menu items is highlighted automatically, by default when the second menu items are initially displayed.

If a signal from one of the direction input keys 80~83 is received (140), the highlight is moved from a currently highlighted second menu item to a different second menu item according to a direction indicated by the received signal (143). If a signal from a direction input key is not received, but Enter 79 signal is received (141), the currently highlighted second menu item is selected and the screen enters the third menu level (144).

Here, if the third menu level is another sub-level menu item, then a space between the selected second menu item and a second menu item adjacent to the selected second menu item would be opened to display at least one third menu item. However, for purpose of explanation, assume from hereon that the third menu level is a function control window. Accordingly, if the third menu level is a function control window, the function control window is displayed in a second region of the screen, different from the first region containing the first menu items and the second menu items. Thereafter, the highlight moves from the first region to the second region and the first of the third menu items, i.e. function controls, is highlighted automatically, by default when the third menu items are initially displayed.

However, if the Menu 77 is entered (142), the screen returns to a state before the second menu level (145). Namely, the opened space between a selected first menu item and an adjacent first menu item closes, thereby the displayed second menu items disappear from the screen to display the first menu items. Here, the highlight may remain with the previously selected first menu item, move to the adjacent first menu item, or move to the first of the first menu item as in the initial display. If the Exit 78 is entered (146), the menu selection ends and the screen returns to the regular TV program (147).

Finally, assuming that the screen is determined to be in the third menu level in step 125 of FIG. 3, the process will be explained with reference to FIG. 5. In the present embodiment, the third menu level is a function window and a default item on the function control window would initially be highlighted.

Accordingly, if a signal from one of the direction input keys 80~83 is received (150), the highlight is moved within the function control window from a currently highlighted item to a different item according to a direction indicated by the received signal (153). Here, the item within the function control window may be a value which can be adjusted by a direction input key. If a signal from a direction input key is not received, but Enter 79 signal is received (151), the currently highlighted second menu item is selected and the screen enters the second menu level (154). Thereafter, the function control window displayed in the second region disappears while the first menu items and the second menu items remain on the screen.

A selection of an item above means a storage of the item, if the item is a value of a function such as for the control of brightness. On the other hand, for functions such as channel memorization, a selection of an item can either mean a storage of a channel or a deletion of a memorized channel.

If the Menu 77 is entered (152), the screen returns to a state before the third menu level (155). Namely, the second region containing the function control window closes. As in the second menu level, the highlight may remain with the previously selected second menu item, move to a second menu item adjacent to the selected second menu item, or move to the first of the second menu item. If the Exit 78 is entered (156), the second region with the function control window closes, the second region with the menu items closes, and the screen returns to the regular TV program (157).

In the present embodiment, further assume that the screen is displayed in a first color, the first menu items are displayed in a second color, the second menu items are displayed in a third color, and the function control window is displayed in a fourth color.

The first to fourth colors may be different and may have different luminances. In such case, the first to fourth colors may be set such that the luminance of the fourth color is the brightest, the luminance of the third color is less bright, the luminance of the second color is still less brighter, and the luminance of the first color is the least bright. Alternatively, the first to fourth colors may be identical while the luminances are different. In this case, the first to fourth colors may also be set such that the luminance of the fourth color is the brightest, the luminance of the third color is less brighter, the luminance of the second color is still less brighter, and the luminance of the first color is the least bright In addition, when the selecting device is operated by pointing or highlighting with the cursor to select a new first menu item while in a second menu level, the displayed second menu items are erased from the first region of the screen and the opened space is closed. Afterwards, a space between the newly selected first menu item and a first menu item adjacent to the newly selected first menu item is opened, and at least one second menu item corresponding to the newly selected first menu item is displayed in the opened space. Also, when a new second menu item is selected by pointing or highlighting with the cursor, the displayed function control window is erased from the second region of the screen and a function control window of the newly selected second menu item is displayed in the second region. In the preferred embodiment, the above process is executed smoothly and continuously.

Figure 6:
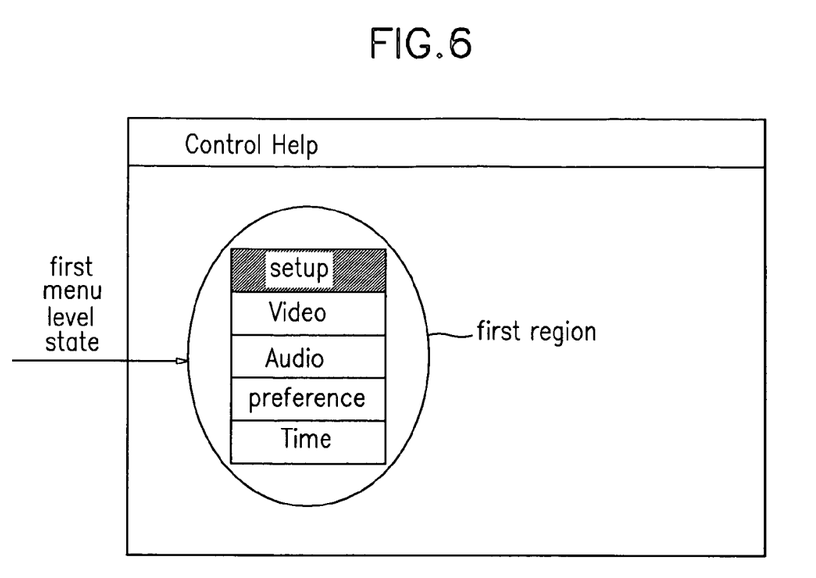
FIGS. 6 to 9 show example display of screens having menu(s) in accordance with the present invention.

FIG. 6 shows an example of a screen with an initial display of first menu items in the first region when a user enters a Menu input key. As shown, the first of the first menu item, i.e. "Set up," is highlighted in the initial display. Thereafter, the highlight (or cursor) can be moved by the direction input keys 80~83 of FIG. 2, and a highlighted item can be selected by the Enter 79 key.

Figure 7:
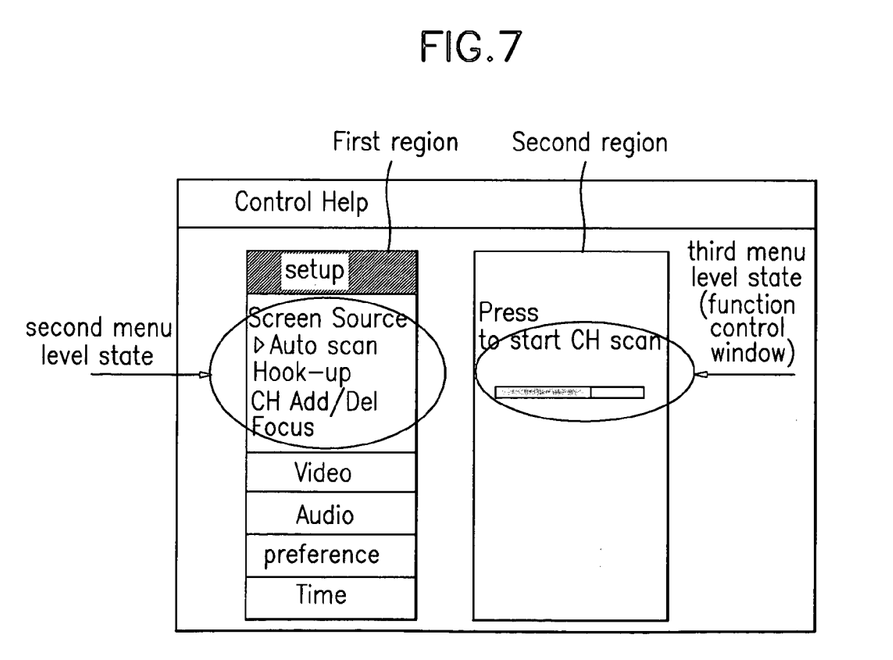

FIG. 7 shows an example of the screen when the "Set up" is selected from the first menu items. Here, the second menu items corresponding to "Set up" are displayed between "set up" and the adjacent first menu item "video." Also, FIG. 7 shows a display of a function control window in a second region of the screen to "auto scan" when "auto scan" is selected from the second menu items.

Figure 8:
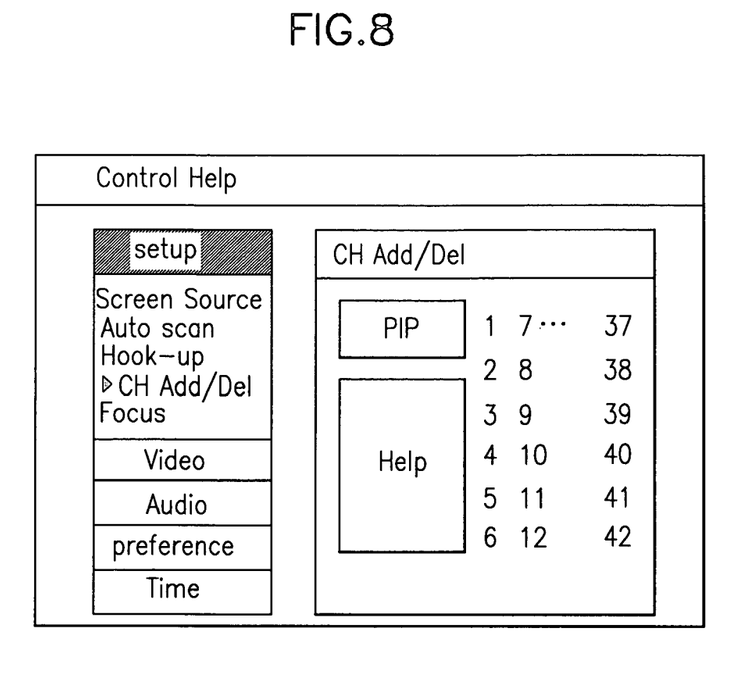
Figure 9:
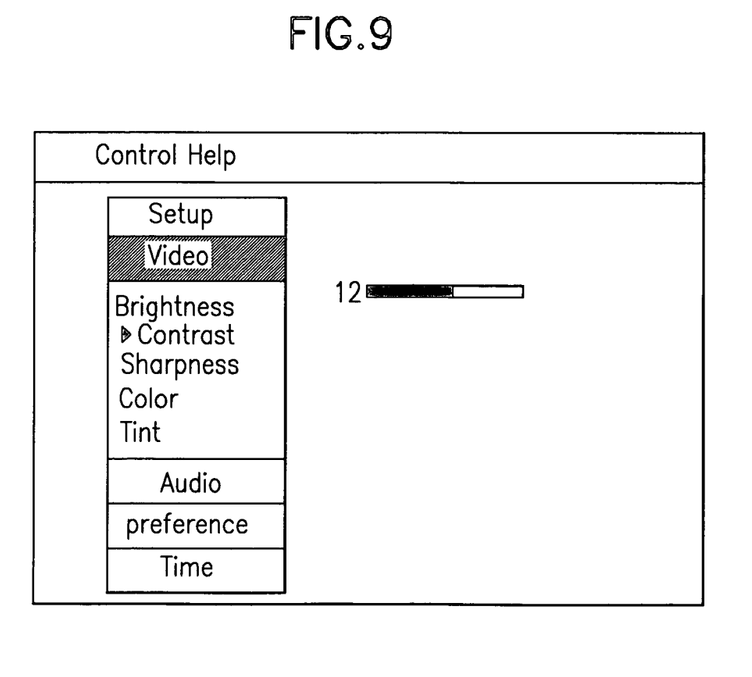

FIG. 8 shows an example of the screen when "set up" is selected from the first menu items, "CH. Add/Del" is selected from the second menu items of "set up," and a function control window for "CH. Add/Del" is displayed in the second region. FIG. 9 shows an example of the screen when "video" is selected from the first menu items, "brightness" is selected from the second menu items, and a function control window for the selected "brightness" is displayed in the second region.

As shown in FIGS. 7~9, a selected first menu item and a selected second menu item may be displayed by two types of highlights. In the present example, the selected first menu item itself is highlighted while the selected second menu item is highlighted by a pointer.

In the first embodiment as described above, the display of menu items changes when a menu item highlighted or pointed by a cursor is selected through a Enter key on a selecting device. However, in a second embodiment of the present invention, the display of menu items is changed simply by moving the cursor. Since the methods of the first and second embodiments are generally the same, the second embodiment will next be explained, with emphasis on the differences.

As in the first embodiment, a plurality of OSD first menu items are displayed in a first region of a screen together with a cursor. The cursor is initially positioned on a first of the first menu item. Thereafter, if a user moves a cursor and points or highlights a first menu item, a space between the highlighted first menu item and a first menu item adjacent to the highlighted first menu item is opened. At least one OSD second menu item corresponding to the highlighted first menu item is then displayed in the opened space. Assuming that the third menu level is a function control window, if the cursor is further moved and points or highlights a second menu item, a function control window corresponding to the highlighted second menu item is displayed in a second region of the screen. Thus, a function can be controlled using the selecting device and cursor.

Also, when the cursor is moved to point at a new first menu item while the screen is in the second menu level, the displayed second menu items are erased from the first region of the screen and the opened space is closed. Afterwards, a space between the newly selected first menu item and a first menu item adjacent to the newly selected first menu item is opened, and at least one second menu item corresponding to the newly selected first menu item is displayed in the opened space. Similarly, when the cursor is moved to point at a new second menu item while the screen is in the third menu level, the displayed function control window is erased from the second region of the screen and a function control window of the newly selected second menu item is displayed in the second region. In the preferred embodiment, the above process is executed smoothly and continuously.

In the second embodiment, the space may open simultaneously with a selection of a menu item or may slide open gradually as in the first embodiment. Furthermore, the screen, the first menu items, the second menu items, and the fourth menu items may be displayed in different combinations of colors and luminances as in the first embodiment.

In a third method embodiment of the present invention, second menu items are displayed with a corresponding function control window, assuming that the third menu level is a function control window. As the method of the third embodiment is generally the same as the first embodiment, the third embodiment will also be described with emphasis on the differences.

According to the third embodiment, a plurality of OSD first menu items are also displayed together with a cursor. When the selecting device is operated to point the cursor and selects a first menu item, a space between the selected first menu item and a first menu item adjacent to the selected first menu item is opened. At least one OSD second menu item corresponding to the selected first menu item is then displayed, where each of the displayed second menu item is displayed with a corresponding function control window. Thus, the selecting device can be operated to control a function of the TV.

In the above process, the space may open simultaneously with a selection of a menu item or may slide open gradually as in the first embodiment. Also, the screen, the first menu items, the second menu items, and the fourth menu items may be displayed in different combinations of colors and luminances as in the first embodiment. However, in the third embodiment, the function control window may also be displayed in a first region of the screen with the menu items rather than being displayed in a second region.

In the present embodiments, if the last of displayed menu items is selected, sub-menu items corresponding to the selected menu item may be displayed in a space beneath the selected menu rather than a space between the selected menu item and an adjacent menu item. Also, when second menu items corresponding to a first menu item is displayed, the second menu items may be displayed in a predetermined order, with a corresponding function control window. Moreover, if a second menu item corresponding to function control window is selected, the remaining second menu items which had not been selected may be erased from the screen.

In sum, the present OSD device and method for displaying a menu displays sub-menu items in a limited space provided between main menu items and permits an effective use of a limited area of the screen. Also, a simultaneous display of main menu items and sub-menu items provides a convenient and user-friendly system for a user when selecting a menu.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for displaying selectable menu items of an OSD menu displayed on a screen of a digital television, the method comprising:
   displaying on the screen a first menu level having a plurality of main menu items, the plurality of main menu items including a first main menu item related to a first set of controllable functions of the digital television and a second main menu item related to a second set of controllable functions of the digital television, each main menu item occupying a separately delineated space of the first region and the first and second main menu items occupying adjacent spaces among the separately delineated spaces;
   allocating, in response to a user selection of one of the first and second main menu items, a new separately delineated space formed by redisplaying the plurality of main menu items to interpose the new separately delineated space between the separately delineated space occupied by the selected main menu item and the separately delineated space occupied by the unselected main menu item, such that the interposed space abuts on each of the separately delineated space occupied by the selected main menu item and the separately delineated space occupied by the unselected main menu item; and
   displaying, in the allocated space, a second menu level having at least one sub-menu item related to the digital television controllable functions of the selected main menu item,
   wherein, upon a user selection of a main menu item other than the selected main menu item, the first menu level is redisplayed by erasing the at least one sub-menu item displayed in the allocated space, closing the allocated space such that the first and second main menu items again occupy adjacent spaces, and then re-executing said allocating.

2. The method of claim 1, wherein the plurality of the main menu items are displayed in a direction from the top to the bottom of the screen.

3. The method of claim 1, wherein the at least one sub-menu item is displayed in a direction from the top to the bottom of the screen.

4. The method of claim 1, wherein the plurality of the main menu items are displayed in a direction from the left to the right of the screen.

5. The method of claim 1, wherein the at least one sub-menu item is displayed in a direction from the left to the right of the screen.

6. The method of claim 1, wherein the plurality of the main menu items are displayed sequentially.

7. The method of claim 1, wherein the at least one sub-menu item is displayed sequentially.

8. A method for displaying a menu using an OSD device of a digital television, the method comprising:
   displaying in a first region a plurality of selectable main menu items and an item indicator for selecting any one of the plurality of selectable main menu items, each main menu item being related to a corresponding set of controllable functions of the digital television and occupying a separately delineated space of the first region;
   allocating, according to a first operation of the item indicator, to select a main menu item a new separately delineated space formed by redisplaying the plurality of main menu items to interpose the new separately delineated space between the separately delineated space occupied by the selected main menu item and the separately delineated space occupied by an unselected main menu item, such that the interposed space abuts on each of the separately delineated space occupied by the selected main menu item and the separately delineated space occupied by the unselected main menu item;
   displaying, in the allocated space, at least one sub-menu item related to the digital television controllable functions of the main menu item selected by the first operation of the item indicator, the at least one sub-menu item being selectable by a second operation of the item indicator; and
   displaying in a second region, according to the second operation of the item indicator, a control function window for enabling at least one function corresponding to the selected at least one sub-menu item;
   wherein, upon a user selection of a main menu item other than the selected main menu item, the first region is redisplayed by erasing the at least one sub-menu item displayed in the allocated space, closing the allocated space, such that selectable main menu items again occupy adjacent spaces, and then re-executing said allocating.

9. An OSD device of a digital television, comprising:
   a storage for storing a system program, an OSD menu successively arranged as a plurality of main menu items, and a set of data values corresponding to at least one sub-menu item assigned to each main menu item, the main menu items including a first main menu item related to a first set of controllable functions of the digital television and a second main menu item related to a second set of controllable functions of the digital television;
   a screen for displaying, according to the stored system program, the OSD menu and an item indicator generated to be displayed with respect to the displayed OSD menu;
   a selecting device for moving the displayed item indicator with respect to the displayed OSD menu and for selecting any one of the plurality of main menu items according to the movement; and
   a controller for controlling the display of said screen,
   wherein the plurality of main menu items is displayed such that each main menu item occupies a separately delineated space of the a region and such that the first and second main menu items occupy adjacent spaces among the separately delineated spaces,
   wherein, in response to a user selection of one of the first and second main menu items, a new separately delineated space is allocated, the new separately delineated space being formed by redisplaying the plurality of main menu items to interpose the new separately delineated space between the separately delineated space occupied by the selected main menu item and the separately delineated space occupied by the unselected main menu item, such that the interposed space abuts on each of the separately delineated space occupied by the selected main menu item and the separately delineated space occupied by the unselected main menu item, and
   wherein, according to the correspondingly stored set of data values, at least one sub-menu item related to the digital television controllable functions of the selected main menu item is displayed in the allocated space; and wherein upon a user selection of a main menu item other than the selected main menu item, the OSD menu is redisplayed by erasing the at least one sub-menu item displayed in the allocated space, closing the allocated space such that the first and second main menu items again occupy adjacent spaces.

10. The OSD device of claim 9, wherein the plurality of the main menu items are displayed in a direction from the top to the bottom of the screen.

11. The OSD device of claim 9, wherein the at least one sub-menu item is displayed in a direction from the top to the bottom of the screen.

12. The OSD device of claim 9, wherein the plurality of the main menu items are displayed in a direction from the left to the right of the screen.

13. The OSD device of claim 9, wherein the at least one sub-menu item is displayed in a direction from the left to the right of the screen.

14. The OSD device of claim 9, wherein the plurality of the main menu items are displayed sequentially.

15. The OSD device of claim 9, wherein the at least one sub-menu item is displayed sequentially.

\* \* \* \* \*